United States Patent
Lindner

[11] Patent Number: 6,060,194
[45] Date of Patent: May 9, 2000

[54] BUTTON CELL WITH RETAINING RING FOR ANODE

[75] Inventor: Hans Jürgen Lindner, Singapore, Singapore

[73] Assignee: Varta Batterie Aktiengesellschaft, Hannover, Germany

[21] Appl. No.: 08/987,078

[22] Filed: Dec. 9, 1997

[30] Foreign Application Priority Data

Dec. 13, 1996 [DE] Germany .......................... 196 51 976

[51] Int. Cl.$^7$ .................................................... H01M 2/08
[52] U.S. Cl. ........................... 429/174; 429/171; 429/185
[58] Field of Search .................. 429/174, 171, 429/185

[56] References Cited

U.S. PATENT DOCUMENTS

| | | | |
|---|---|---|---|
| 4,302,517 | 11/1981 | Dzlak | 429/174 X |
| 5,725,967 | 3/1998 | Tuttle | 429/174 X |
| 5,843,597 | 12/1998 | Getz | 429/174 |

OTHER PUBLICATIONS

"Rechargeable Batteries in Japan," by Y. Miyake and A. Kozawa, JEC Press Inc. 1977, 3 pages. (No Month).

*Primary Examiner*—John S. Maples
*Attorney, Agent, or Firm*—Schnader Harrison Segal & Lewis LLP

[57] ABSTRACT

The invention relates to a rechargeable button cell, which contains negative and positive electrodes in the form of tablets separated by a separator and an alkaline electrolyte in a casing which is formed from a lower part in the form of a cup and an upper part in the form of a lid which fits therein, the casing parts being sealed in a gas-tight manner by swaging or crimping with the interposition of a sealing ring. The button cells according to the invention have a sealing ring (4) which has on the edge pointing into the button cell at least 3 retaining tabs (9) which hold and center the electrode tablet (3) located in the casing upper part (1). The method according to the invention for manufacturing the button cell is distinguished by separate prior assembly of the casing lower part with the positive electrode and the casing upper part with the negative electrode.

15 Claims, 2 Drawing Sheets

BUTTON CELL WITH RETAINING RING FOR ANODE

BACKGROUND OF THE INVENTION

1. Field of the Invention

The invention relates to a rechargeable button cell, which contains negative and positive electrodes in the form of tablets separated by a separator and an alkaline electrolyte in a casing which is formed from a lower part in the form of a cup and an upper part in the form of a lid which fits therein, the casing parts being sealed in a gas-tight manner by swaging or crimping with the interposition of a sealing ring.

The invention furthermore relates to a method for manufacturing cells of the type mentioned above.

2. Description of Related Art

Rechargeable button cells and their physical design are known from the document "Rechargeable Batteries in Japan" edited by Y. Miyatake and A. Kozawa, JEC Press Inc., 1977, p. 388–391. In this case, these cells are assembled in such a manner that the positive electrode, which is pressed in the form of a tablet, is inserted into the cell container, alkaline electrolyte is added in a controlled manner, the separator, the negative electrode in the form of a tablet and the lid with the contact spring and sealing ring are positioned above the electrolyte, and the cell is sealed in a gas-tight manner by swaging or crimping the edge of the container over the edge of the lid. During the assembly process described above, it is absolutely essential for the electrodes to be positioned centrally and not to move into an eccentric, offset position as a result of mechanical influences, for example caused by vibration from the feed process on the assembly line. In this case, there is a risk of the separator being moved laterally and, in consequence, of the electrodes being short-circuited, and this can lead to total failure of the electrochemical cell. In addition, if the electrodes are in an eccentric position, there is a risk of it no longer being possible to join the seal and the cell lid centrally which, in the case of automatic assembly with high production rates, leads to damage to the seal and/or to the negative electrode. The latter has a disadvantageous influence on both the sealing properties and the electrical characteristics of the electrochemical cell. This is evident, for example, in an increase in the internal resistance of the cell.

BRIEF SUMMARY OF THE INVENTION

The invention is based on the object of specifying a rechargeable button cell and a method for its manufacture which allow the electrodes and the separator to be positioned in the button cell centrally, and such that they are protected against short circuits, during automatic manufacture at high production rates.

According to the invention, the object is achieved in that, in the case of button cells of the type described above, the sealing ring has on the edge pointing into the button cell at least 3 retaining tabs which hold and center the electrode tablet located in the casing upper part.

The method according to the invention for manufacturing a button cell is carried out in such a manner that electrolyte, an electrode tablet and the separator are introduced into the casing lower part in the form of a cup, that the casing upper part, in the form of a lid, is fitted with the sealing ring, the other electrode tablet and, possibly, with a contact spring, and that the casing upper part is folded onto the casing lower part and the casing of the button cell is sealed in a gas-tight manner by swaging or crimping. The button cell according to the invention and the method for its manufacture have the advantage that one of the electrodes is clamped in the casing upper part, in the form of a lid, by the cell seal such that it is protected again vibration. The retaining tabs located on the inside of the sealing ring ensure that the electrode is seated centrally. The separate prior assembly of the positive and negative electrodes, on the one hand in the casing lower part in the form of a cup and on the other hand in the casing upper part in the form of a lid, allow highly-automated production. The clamping and centering of one electrode in the casing upper part furthermore has the advantage that automatic assembly, with short-circuit protection, can be carried out at a high production rate without damage to the sealing ring or to the negative electrode. Furthermore, clamping one electrode in the casing upper part in the form of a lid allows simple prior fitting of a contact spring, since this is held in the casing upper part by the electrode tablet located above it, without any additional welded joint.

BRIEF DESCRIPTION OF THE FIGURES

The invention is explained in the following text using FIGS. 1–3 by way of example.

DETAILED DESCRIPTION OF THE INVENTION

Figure 1:
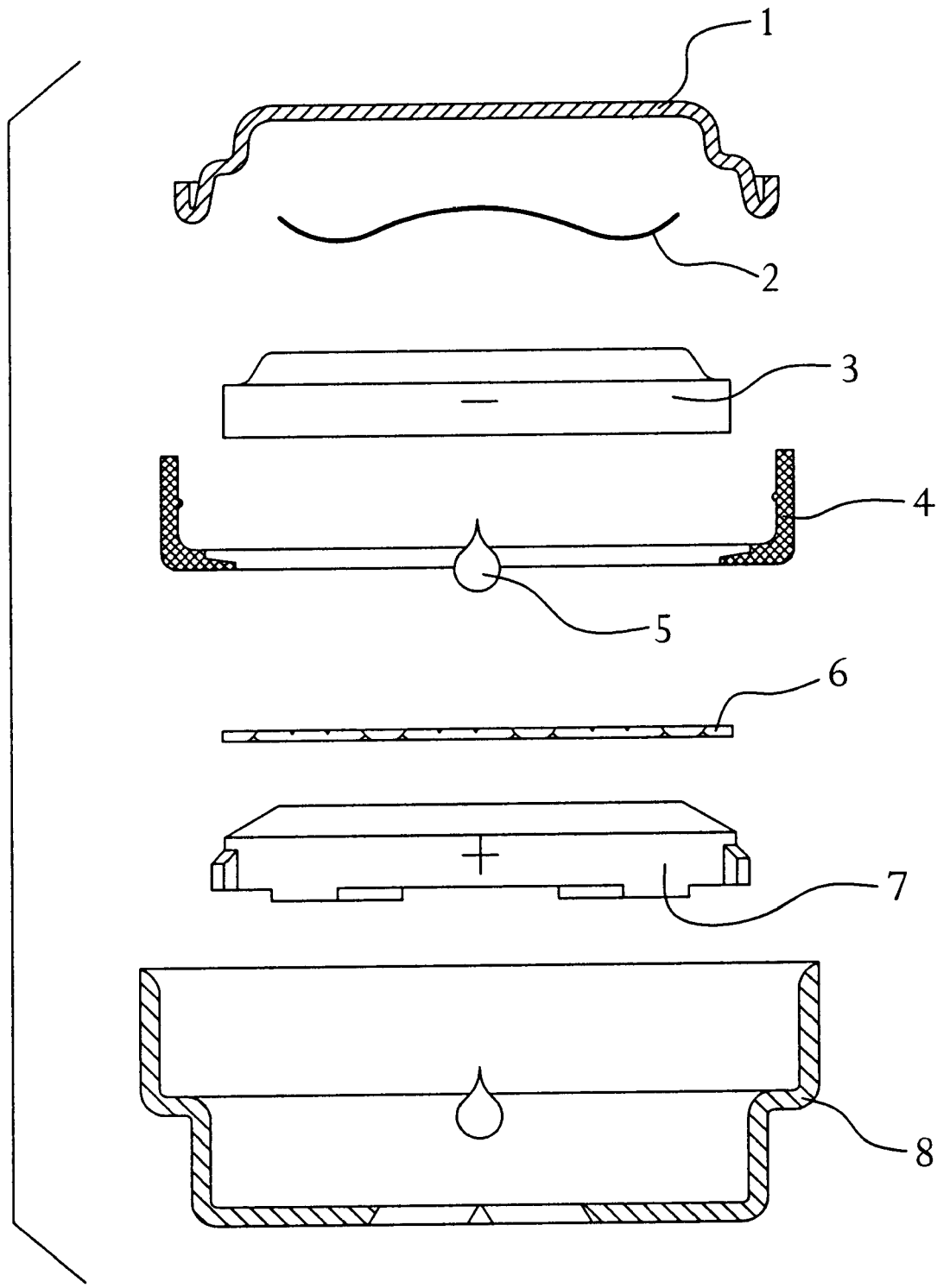
FIG. 1 shows a sectional illustration of the individual parts of a rechargeable button cell according to the invention.
Figure 2:
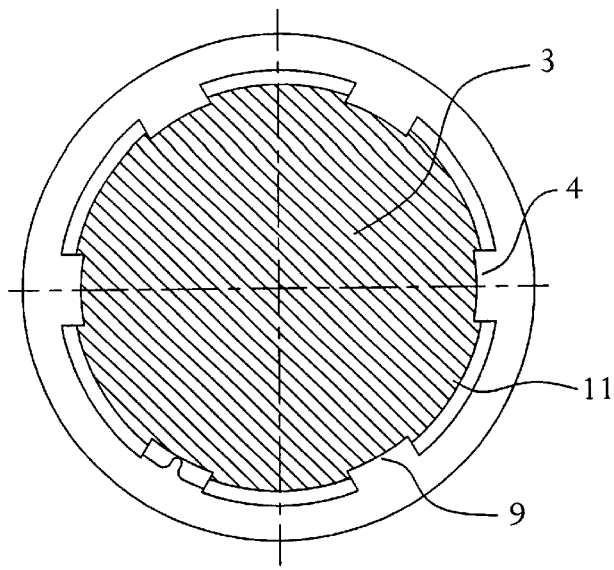
FIG. 2 shows the inside of the casing upper part, in the pre-assembled state.
Figure 3A:
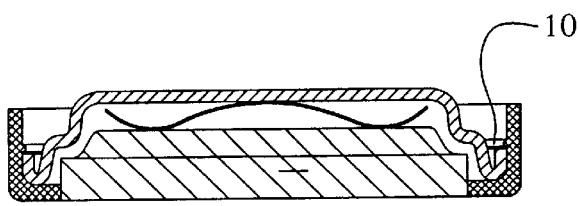
FIG. 3 shows the refinement Versions A to E of the retaining tabs illustrated with the aid of the section through the casing upper part in the pre-assembled state.
Figure 3B:
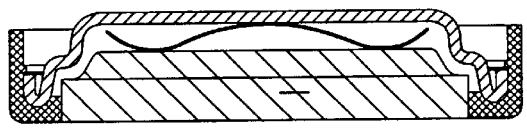
Figure 3C:
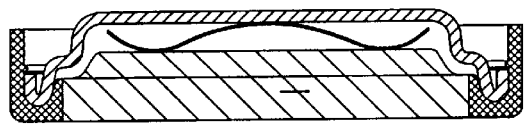
Figure 3D:
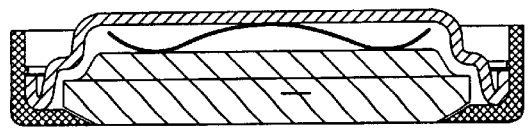
Figure 3E:
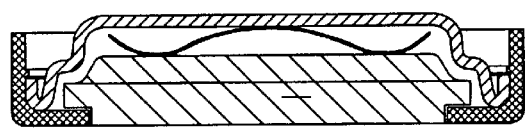

The rechargeable button cells according to the invention are manufactured, according to FIG. 1, in such a manner that, in the first of two separate initial assembly lines, electrolyte 5, the positive electrode 7 and the separator 6 are introduced into the casing lower part 8 in the form of a cup. In a second line, the contact spring 2 as well as the negative electrode 3 are inserted into the casing upper part 1, in the form of a lid, and are held and centered by fitting the sealing ring 4. The pre-assembled casing upper part is then folded onto the pre-assembled casing lower part, and the two parts are sealed in a gas-tight manner by swaging or crimping the edge of the container of the casing lower part 8 over the edge of the lid of the casing upper part 1. FIG. 2 shows that the negative electrode tablet 3 is held centrally in the casing upper part 1 by the retaining tabs 9 on the sealing ring 4, gas exchange channels 11 remaining free. These gas exchange channels 11 are required to allow the gas produced in overcharging reactions to be converted on the rear of the negative electrode 3, which is designed as a gas dissipation electrode. FIG. 3 shows the Versions A–E for the refinement of the retaining tabs 9 in conjunction with corresponding designs of the negative electrode tablet 3. In Versions A–C, the electrode tablet 3 is held by retaining tabs 9 by means of a push fit, the retaining tabs 9 extending to an increasing extent along the side surface of the electrode tablet 3.

In Version D, the edge of the electrode tablet 3 pointing towards the separator is chamfered. The retaining tabs 9 then have a matching chamfer according to the invention and hold the electrode tablet 9 in the casing upper part 1 by partially covering it.

In Version E, an annular step is formed in the electrode tablet 3, into which the retaining tabs 9 extend.

The sealing ring 4 is preferably held on the casing upper part 1 by a thickened region 10 which is in the form of a bead running around the inside of the sealing ring 4. In this case, when the sealing ring 4 is pushed onto the casing upper part 1, the casing upper part 1, whose lid edge is preferably folded back, latches in behind the thickened region 10 (which is in the form of a bead) of the sealing ring 4 to provide a clip connection.

What is claimed is:

1. A gas-tight sealed button cell comprising:
   (a) an assembled lower casing comprising a lower container having a cup shape, a positive electrode in conductive contact with the lower container, a non-conductive separator, a lower casing edge, and an electrolyte; and
   (b) an assembled upper casing comprising an upper container having a peripheral substantially curved portion, a negative electrode in conductive contact with and centrally seated in the upper container, a sealing ring having a plurality of retaining tabs of substantially equivalent size for retaining and centering the negative electrode, a recessed area in each of the plurality of retaining tabs for receiving the curved portion of the upper casing, an upper casing edge, and an electrolyte;
   wherein the upper casing is positioned onto the lower casing and the lower casing edge is sealed over the upper casing edge.

2. The button cell of claim 1, wherein the lower casing edge is sealed over the upper casing edge by swaging or crimping.

3. The button cell of claim 1, wherein the sealing ring has a thickened region for retaining the sealing ring on the upper casing and for providing a clip connection.

4. The button cell of claim 1, in which the upper casing further comprises a contact spring conductively positioned between the upper container and the negative electrode.

5. The button cell of claim 1, wherein the retaining tabs extend to form a push fit between the sealing ring and the negative electrode.

6. The button cell of claim 1, wherein the retaining tabs partially extend over a bottom surface of the negative electrode.

7. The button cell of claim 1, wherein one or more gas exchange channels are formed between the negative electrode and the sealing ring.

8. The button cell of claim 1, wherein the lower casing edge is sealably crimped over the upper casing edge to seal the cell in which the electrically conductive upper casing is electrically isolated from the electrically conductive lower casing.

9. The button cell of claim 1, wherein the lower casing edge is sealably swaged over the upper casing edge to seal the cell in which the electrically conductive upper casing is electrically isolated from the electrically conductive lower casing.

10. The button cell of claim 1 in which the positive electrode is in pressed tablet form and the negative electrode is in pressed tablet form.

11. The button cell of claim 1 in which the negative electrode is chamfered on a bottom surface and the retaining tabs are cooperatively chamfered to adaptably secure the electrode into position.

12. The button cell of claim 1 in which the negative electrode comprises an annular step into which retaining tabs extend.

13. The button cell of claim 1 in which the sealing ring comprises at least three retaining tabs.

14. The button cell of claim 3 in which the thickened region of the sealing ring is a sealing bead.

15. The button cell of claim 1, wherein:
   the upper casing and the lower casing are sealed gas-tight by swaging or crimping in which the electrically conductive upper casing is electrically isolated from the electrically conductive lower casing;
   the sealing ring has a thickened region which is a sealing bead, for retaining the sealing ring on the upper casing and for providing a clip connection, and at least three retaining tabs extending to form a push fit between the sealing ring and the negative electrode;
   the upper casing further comprises a contact spring conductively positioned between the upper container and the negative electrode;
   the positive electrode is in a pressed tablet form and the negative electrode is a gas-dissipation electrode in a pressed tablet form; and
   one or more gas exchange channels are formed between the negative electrode and the sealing ring.

* * * * *